(12) United States Patent
Simonovich

(10) Patent No.: US 11,732,736 B1
(45) Date of Patent: Aug. 22, 2023

(54) HYDRAULIC PUMP WITH ALTERNATE POWER SYSTEM

(71) Applicant: Skylift Inc., Lorain, OH (US)

(72) Inventor: Donald Simonovich, Vermilion, OH (US)

(73) Assignee: SKYLIFT INC., Lorain, OH (US)

( * ) Notice: Subject to any disclaimer, the term of this patent is extended or adjusted under 35 U.S.C. 154(b) by 437 days.

(21) Appl. No.: 16/983,504

(22) Filed: Aug. 3, 2020

(51) Int. Cl.
| | |
|---|---|
| F15B 21/14 | (2006.01) |
| F04B 17/03 | (2006.01) |
| F04B 17/05 | (2006.01) |
| F16D 43/04 | (2006.01) |
| H02K 7/00 | (2006.01) |
| H02K 11/00 | (2016.01) |
| H02J 7/14 | (2006.01) |
| H02K 7/108 | (2006.01) |
| B60K 17/10 | (2006.01) |

(52) U.S. Cl.
CPC ............. *F15B 21/14* (2013.01); *F04B 17/03* (2013.01); *F04B 17/05* (2013.01); *F16D 43/04* (2013.01); *H02J 7/1423* (2013.01); *H02K 7/003* (2013.01); *H02K 7/108* (2013.01); *H02K 11/0094* (2013.01); *B60K 17/10* (2013.01); *F15B 2211/20515* (2013.01); *F15B 2211/20523* (2013.01)

(58) Field of Classification Search
CPC ............ F15B 21/14; F15B 2211/20515; F15B 2211/20523; Y10T 74/19014
See application file for complete search history.

(56) References Cited

U.S. PATENT DOCUMENTS

| | | | | |
|---|---|---|---|---|
| 6,554,088 B2 * | 4/2003 | Severinsky | ............. | B60L 58/12 180/65.23 |
| 9,109,586 B2 * | 8/2015 | Yamada | ................ | E02F 9/2095 |
| 9,243,384 B2 * | 1/2016 | Yamashita | .............. | F15B 21/14 |
| 9,399,856 B2 * | 7/2016 | Fujishima | ............. | E02F 9/2296 |

FOREIGN PATENT DOCUMENTS

| | | | | | |
|---|---|---|---|---|---|
| DE | 4128297 C1 * | 12/1992 | | ............. | B60K 16/00 |
| GB | 2522261 A * | 7/2015 | | ............. | B60K 25/02 |
| WO | WO-2012118506 A1 * | 9/2012 | | ............. | B60K 6/442 |

* cited by examiner

*Primary Examiner* — Michael Leslie
(74) *Attorney, Agent, or Firm* — Emerson, Thomson & Bennett, LLC; Roger D. Emerson

(57) ABSTRACT

Provided in this disclosure is a digger/derrick system (or generally any type of machine) having a diesel engine to power a hydraulic system for raising and lowering the digger/derrick and powering other components. The system includes a centrifugal clutch that engages the diesel engine while the engine is running, thereby powering an electrical generator that drives the hydraulic pump while also charging an on-board battery bank system. When the engine is turned off, the centrifugal clutch is decoupled. The battery banks then power the generator, which in turn drives the hydraulic pump. In this manner, the digger/derrick offers the advantages of noise reduction as the hydraulic systems can be operated without running a noisy diesel engine. This noise reduction after enhances safety since operators elevated in the derrick and operators on the ground can more readily communicate to give clear warnings to avoid danger and other undesirable circumstances.

9 Claims, 8 Drawing Sheets

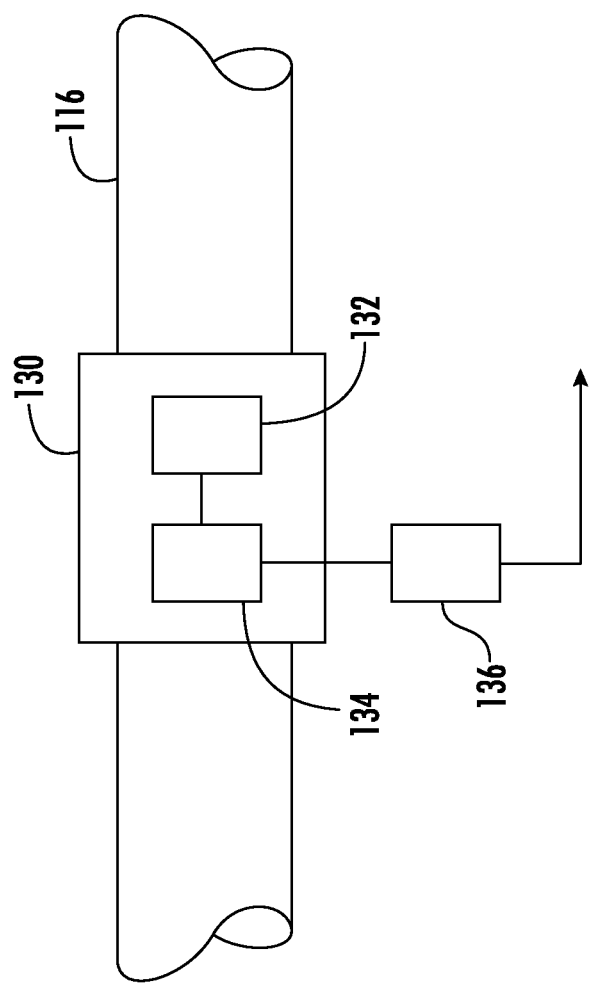

HYDRAULIC PUMP WITH ALTERNATE POWER SYSTEM

I. BACKGROUND

A. Technical Field

This invention pertains to the field of powered hydraulic equipment, particularly digger/derrick systems having a hydraulically operated system that drives a track drive system, boom assembly and an auger assembly.

B. Description of Related Art

Digger/derrick systems are commonly used that include an auger for digging holes into the ground for sinking utility poles, wells, and other such operations. Common digger/derrick systems are typically operated using diesel engines that power a hydraulic pump for raising and powering an arm and for rotating the auger, in addition to a bucket for lifting personnel into the air.

It is known that diesel engines are noisy and operating a digger/derrick system necessarily results in increased ambient noise level. However, such elevated noise levels are undesirable in certain situations, such as near hospitals or in residential settings where individuals would be disturbed by loud noise. Elevated noise levels also pose a hearing hazard for workers and other personnel at a job site.

II. SUMMARY

Provided in this disclosure is a drive system including a diesel engine for producing power for a hydraulic system to raise and lower a working component. The diesel engine rotates a drive shaft having an axis of rotation. A centrifugal clutch is provided having at one or more internal flyweights in rotational engagement with the flywheel of the diesel engine. The centrifugal clutch also includes a clutch drum connected to an input shaft of the motor/generator coaxially configured with the drive shaft around the axis of rotation. The internal flyweights rotationally engage the clutch drum while the diesel engine is running.

The centrifugal clutch drum is mated to the generator/motor input shaft. The generator/motor is coaxially mounted to the adapter ring around the axis of rotation. A hydraulic pump is coaxially mounted to the electrical generator/motor around the axis of rotation for powering the hydraulic system. A battery bank system is charged by electrical power from the electrical generator/motor while the diesel engine is running in a diesel mode. The battery bank system powers the electrical generator/motor in a hybrid mode when the engine is turned off and the centrifugal clutch is decoupled. With the clutch decoupled, the generator/motor drives the hydraulic pump without spinning the diesel engine.

According to an aspect of the invention, the present drive system reduces noise while maintaining performance.

According to another aspect of the invention, the present drive system provides an alternative battery power source in the event of failure of the diesel engine.

According to yet another aspect of the invention, the present drive system emits zero fossil fuel emissions during battery operational mode.

Other benefits and advantages of this invention will become apparent to those skilled in the art to which it pertains upon reading and understanding of the following detailed specification.

III. BRIEF DESCRIPTION OF THE DRAWINGS

The disclosed drive system may take physical form in certain parts and arrangement of parts, embodiments of which will be described in detail in this specification and illustrated in the accompanying drawings which form a part hereof and wherein:

FIG. 7 is a schematic of a pressure sensor system for automatically deactivating the hydraulic pump to conserve battery power in accordance with an exemplary embodiment of the present invention.

IV. DETAILED DESCRIPTION

Figure 1:
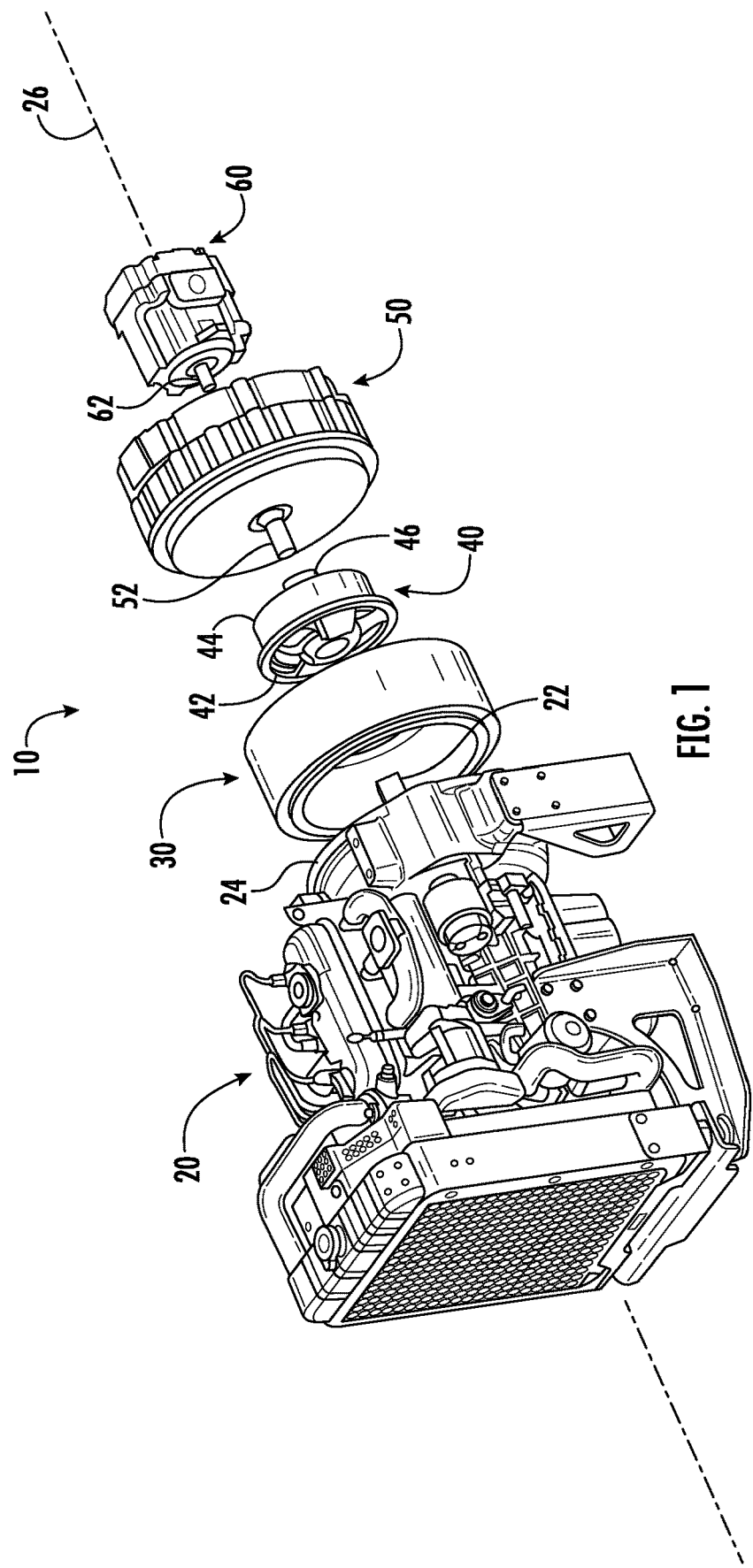
FIG. 1 is an exploded view of the drive system in accordance with an exemplary embodiment of the present invention.

Referring now to the drawings wherein the showings are for purposes of illustrating embodiments of the article only and not for purposes of limiting the same, and wherein like reference numerals are understood to refer to like components:

FIG. 1 shows a drive system 10 in accordance with an exemplary embodiment. An engine 20 is provided for producing power for a hydraulic system to raise and lower a working component (as explained hereinbelow). In the preferred embodiment, the engine 20 is a diesel engine 20 of the type sold by Kubota Corporation. However, any suitable diesel engine 20 or other type of internal combustion engine could alternatively be employed without departing from the invention. In the preferred embodiment, the engine 20 includes an SAES bell housing. The diesel engine 20 rotates a flywheel 22 located inside a distal end 24 of the engine 20, where the flywheel 22 has an axis of rotation 26. An adapter ring 30 is mounted to the distal end 24 of the diesel engine 20.

As further shown in FIG. 1, a centrifugal clutch 40 is provided for selective engagement with the diesel engine 20. The centrifugal clutch 40 includes one or more internal flyweights 42 in rotational engagement with the drive shaft 22 of the diesel engine 20. A clutch drum 44 is connected to an output shaft 46 coaxially configured with the drive shaft 22 of the diesel engine 20 around the axis of rotation 26.

As also indicated in FIG. 1, the centrifugal clutch 40 of the present invention functions in a typical manner for such devices. The operation of the engine 20 rotates the flywheel 22, which in turn rotates the centrifugal clutch 40. Internal flyweights 42 retained inside the centrifugal clutch 40 are displaced outwardly by centrifugal force due to the rotation, acting in an axial direction perpendicular to the axis of the rotation 26. The internal flyweights 42 are retained inside the clutch drum 44 so that their outward axial displacement due to the rotation causes the internal flyweights 42 to rotationally engage the internal surface of the clutch drum 44 while the diesel engine 20 is running. The clutch drum 44 has generally cylindrical walls centered along the axis of rotation 26 so that the internal flyweights 42 contact the internal surface of the cylindrical walls of the clutch drum 44 while the diesel engine 20 is running. The centrifugal clutch 40 engages at normal engine idle. The clutch drum 44 is preferably formed integrally with the output shaft 46 so that rotation of the clutch drum 44 by engagement with the internal flyweights 42 results in rotation of the output shaft 46 and further transmission of rotation.

As further indicated in FIG. 1, the centrifugal clutch 40 is mated to the engine's flywheel 22. An electrical generator/motor 50 is coaxially mated to the dutch drum 44 of the centrifugal clutch 40 around the axis of rotation 26. The generator/motor 50 includes a generator input shaft 52 which engages with the centrifugal clutch 40. The electrical generator/motor 50 produces electrical power while the diesel engine 20 is running, due to engagement of the centrifugal clutch 40 with the electrical generator/motor 50. The generator/motor produces 70 NM of torque when being spun at 2400 RPM. The generator/motor requires 306 amps to produce that amount of torque. The adapter ring 30 is mounted to the distal end 24 of the diesel engine 20 while centrally receiving the centrifugal clutch 40 therein and engages and retains the electrical generator/motor 50. The adapter ring 30 is generally cylindrical and centered along the axis of rotation 26.

As additionally depicted in FIG. 1, a hydraulic pump 60 is coaxially mounted to the electrical generator/motor 50 around the axis of rotation 26 for powering the hydraulic system (mentioned in greater detail hereinbelow). The hydraulic pump 60 includes a pump shaft 62 that is rotationally connected to the generator shaft 52 of the generator/motor 50 so that when the centrifugal clutch 40 is engaged, the hydraulic pump 60 rotates in tandem along with the generator/motor 50. In this manner, the engine 20 drives both the generator/motor 50 and the hydraulic pump 60 when the centrifugal clutch 40 is engaged.

Figure 2:
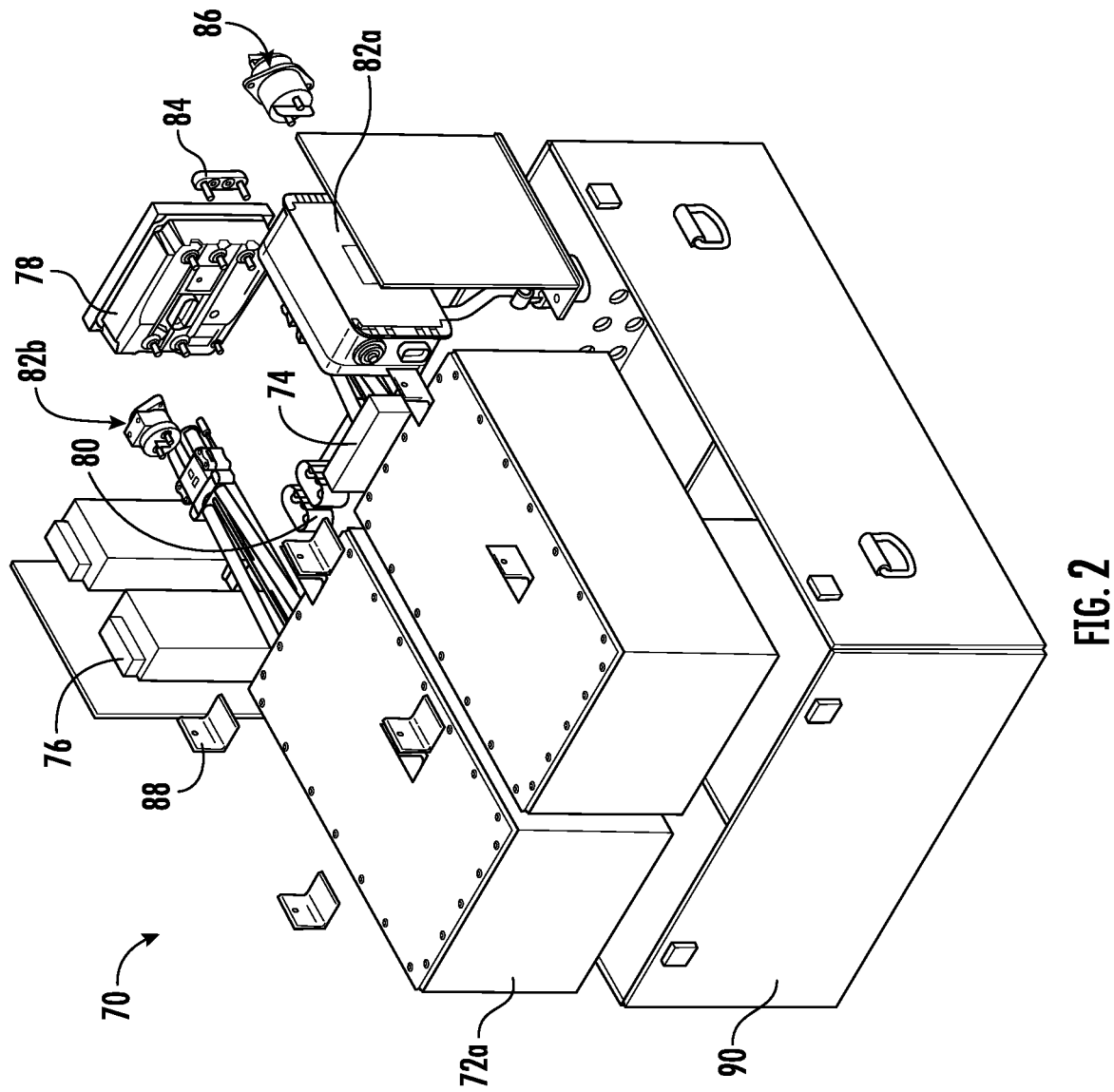
FIG. 2 is an exploded view of a battery bank system for the drive system in accordance with an exemplary embodiment of the present invention.

As shown in FIG. 2, a battery bank system 70 is charged by electrical power from the electrical generator/motor 50 while the diesel engine 20 is running. In a hybrid mode of operation of the present drive system 10, the battery bank system 70 powers the electrical generator/motor 50 when the engine 20 is turned off and the centrifugal clutch 40 is decoupled. In this manner, the stored electrical energy in the battery bank system 70 in turn drives the hydraulic pump 60 in the hybrid mode.

As further shown in FIG. 2, the battery bank system 70 includes a pair of battery packs 72a, 72b which are preferably lithium-iron phosphate batteries. In the preferred embodiment, the battery packs 72a, 72b are bank model 51 V 150AH F24 GT UL Module manufactured by Lithionics Battery. This is a 51.2V module with a capacity of 150 amp hours and produces 7,680 watt hours of energy. In the preferred embodiment, the estimated run time of the hydraulic pump 60 while operating on battery power would be comparable to operating the engine 20 at 2400 RPM for 1 hour of run time, such that the battery bank system 70 will supply that amount of power for that amount of time.

As additionally shown in FIG. 2, the battery bank system 70 includes a DC/DC' converter 74 that separates the 51.2V side and the 12V side. This is needed to ensure that voltages don't cross. Buss bars 76 are used to make positive and negative electrical connections. A generator controller 78 controls the generator/motor 50 and communicates back and forth with a battery BMS (mentioned below) and a master controller. The generator controller 78 also monitors the operation of the generator/motor 50. A battery pack junction box 80 is provided when two or more battery banks are being used. Each battery bank is plugged into the junction box 80 to provide one single positive and negative output. A battery controller 82a (i.e., a battery BMS) monitors the battery banks, ensures they are operating properly, and balances charging. A contactor 82b connects and disconnects the system's power supply when instructed by the generator controller 78. A fuse holder 84 holds a 400 amp ANL fuse. A manual battery disconnect 86 disconnects the positive side of the battery system for maintenance/safety when not in use. Battery hold downs 88 hold the batteries in place during transportation. The connection between the generator/motor 50 and the battery bank system 70 is made from (3) 2/0 power cables that are run from generator controller 78 to the generator/motor 50.

Figure 3:
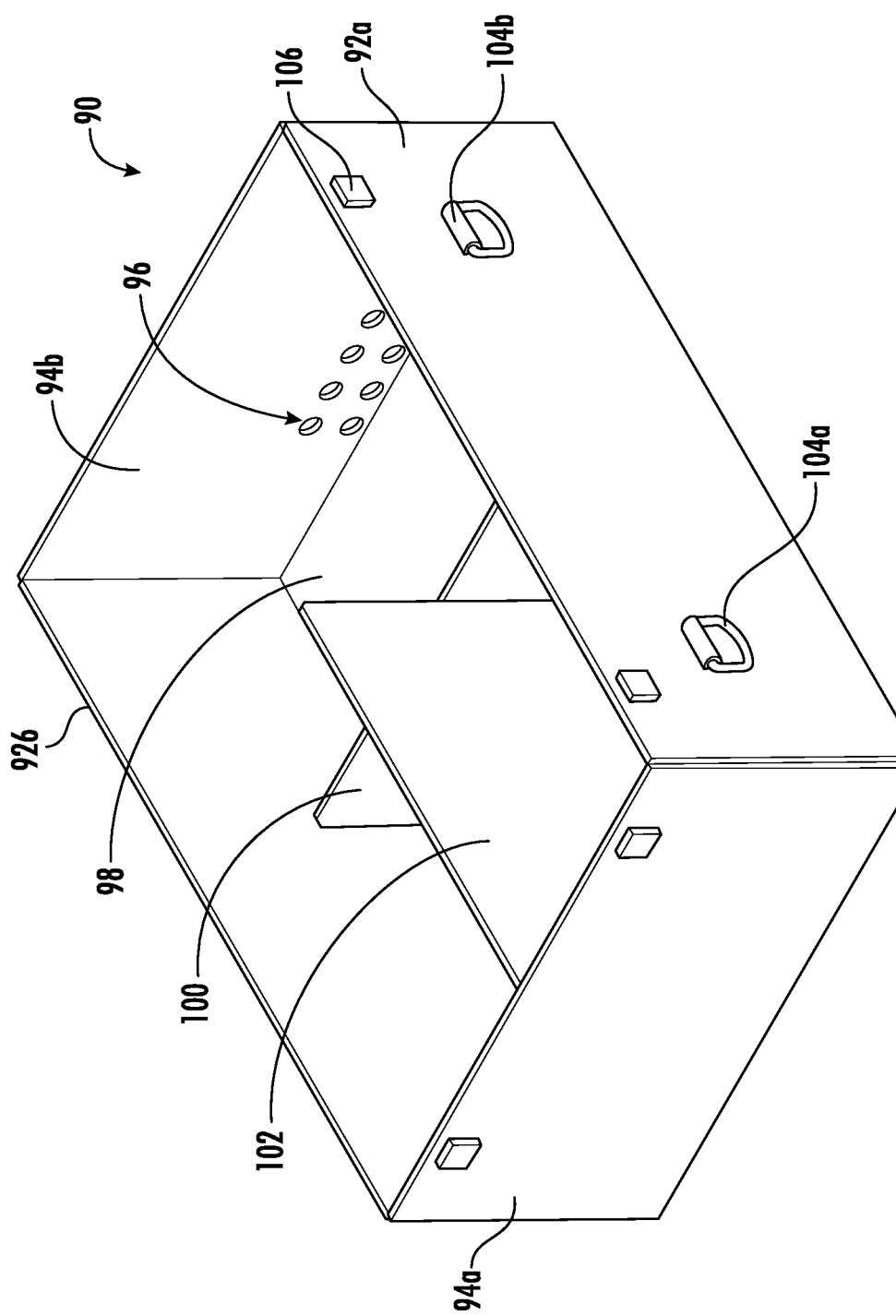
FIG. 3 is a perspective view of a battery box for retaining the battery bank system of the drive system in accordance with an exemplary embodiment of the present invention.

As shown in FIG. 3, the aforementioned components of the battery bank system 70 are retained inside a battery box 90. The battery box 90 is defined by four vertical sides including a first and a second front slab battery tray 92a, 92b and a first and a second front slab plate 94a, 94b. The second front slab plate 94b includes tank flanges 96 so that wire grips can be inserted into them. These wire grips are used for routing wire through and sealing off the elements. A front slab battery tray bottom 98 defines a bottom surface to the battery box 90. A rear divider plate 100 and a middle divider plate 102 define distinct left and right volumes within the battery box 90 for retaining and supporting the battery packs 72a, 72b. A rear volume is defined in the remainder of the battery box 90 for retaining and supporting the remaining components of the battery bank system 70. A pair of D-rings 104a, 104b are mounted to the exterior of first front slab battery tray 92 that are used for securing material onto the battery box cover 90a. A plurality of front battery box standoffs 106 are mounted near the tops of the exteriors of the front battery trays 92a and front slab plates 94a, 94b. The standoffs 106 are for mounting the cover to the battery box 90. These standoffs 106 are tapped for a bolt to secure the cover to the battery box 90. The standoffs offer more thread engagement for the mounting bolt.

Figure 4A:
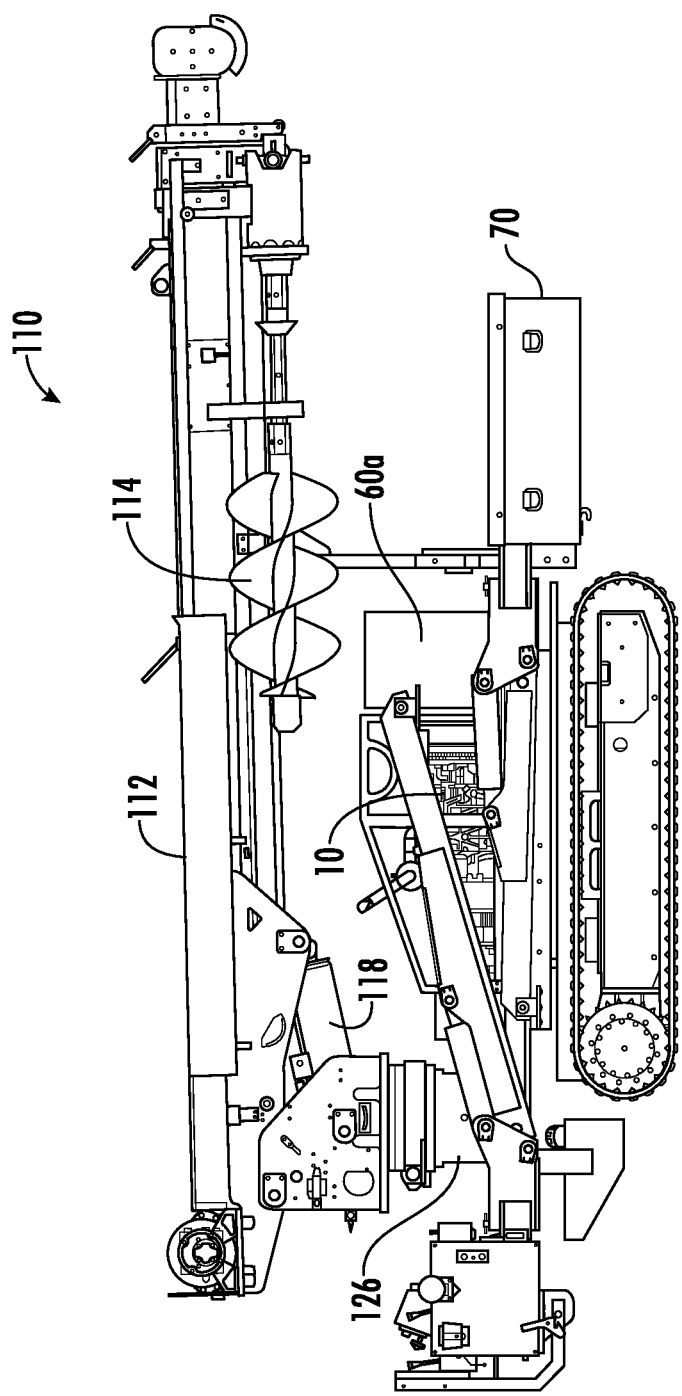
FIGS. 4A and 4B are respective side and partially exploded perspective views of a digger/derrick system including a drive system in accordance with an exemplary embodiment of the present invention.
Figure 4B:
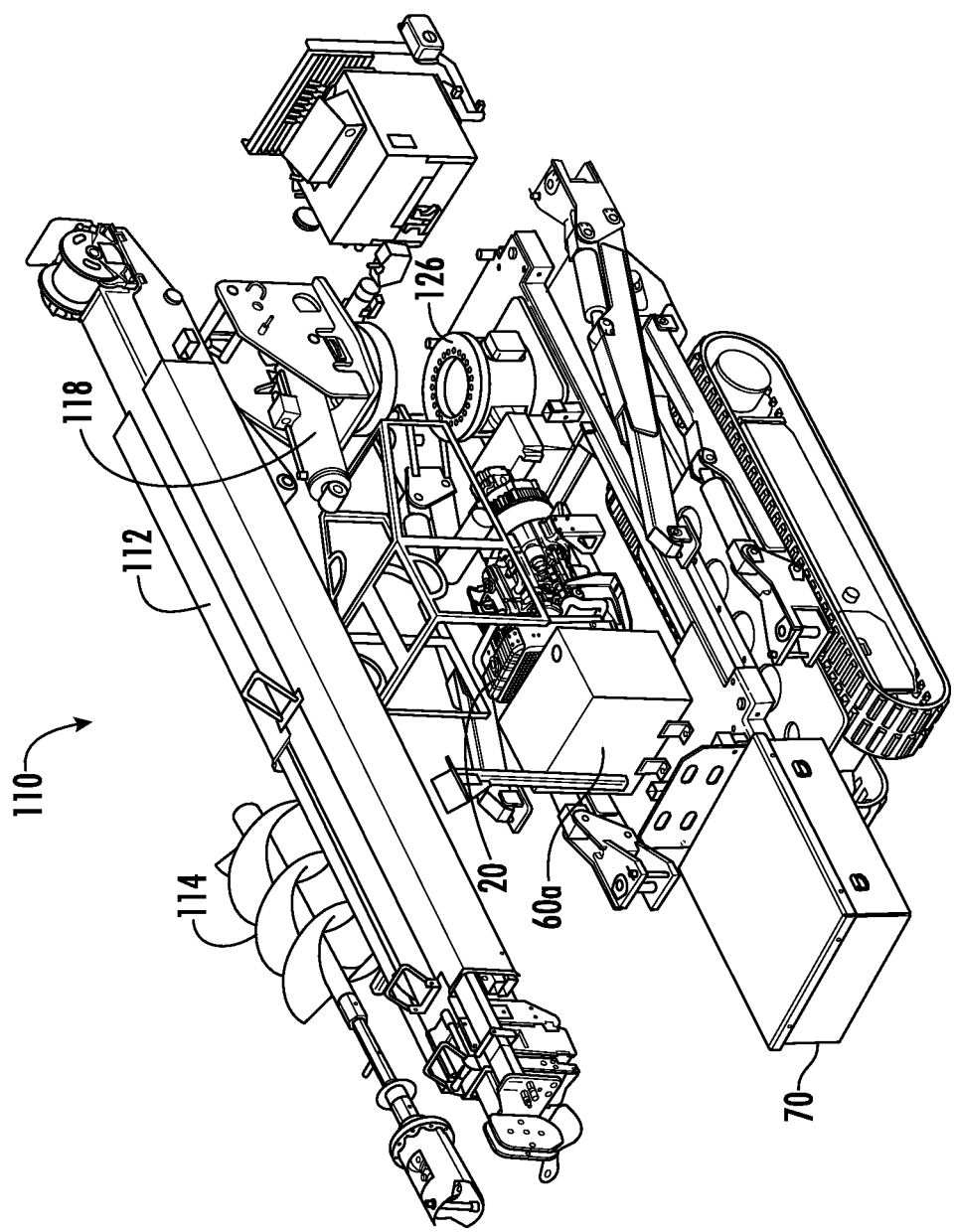

Turning now to FIGS. 4A and 4B, a digger/derrick system 110 is depicted including a working component in the form of a digger/derrick arm 112, which can include an auger 114 for digging holes for wells, or into which utility poles can be sunk, etc. The drive system 10 is shown within the digger/derrick system 110. In particular, as illustrated in FIG. 4, the drive system 10 includes the engine 20 in operative connection with the adapter ring 30, centrifugal clutch 40, electrical generator/motor 50 and hydraulic pump 60. The hydraulic pump 60 is part of a hydraulic system. The hydraulic pump 60 produces the necessary flow and pressure to operate cylinders, track drive motors, auger assemblies and tools. The hydraulic fluid is run through various hydraulic lines throughout the machine. There are various valves that control the various machine functions. There is also a radio remote that controls the hydraulic functions as well.

Figure 5:
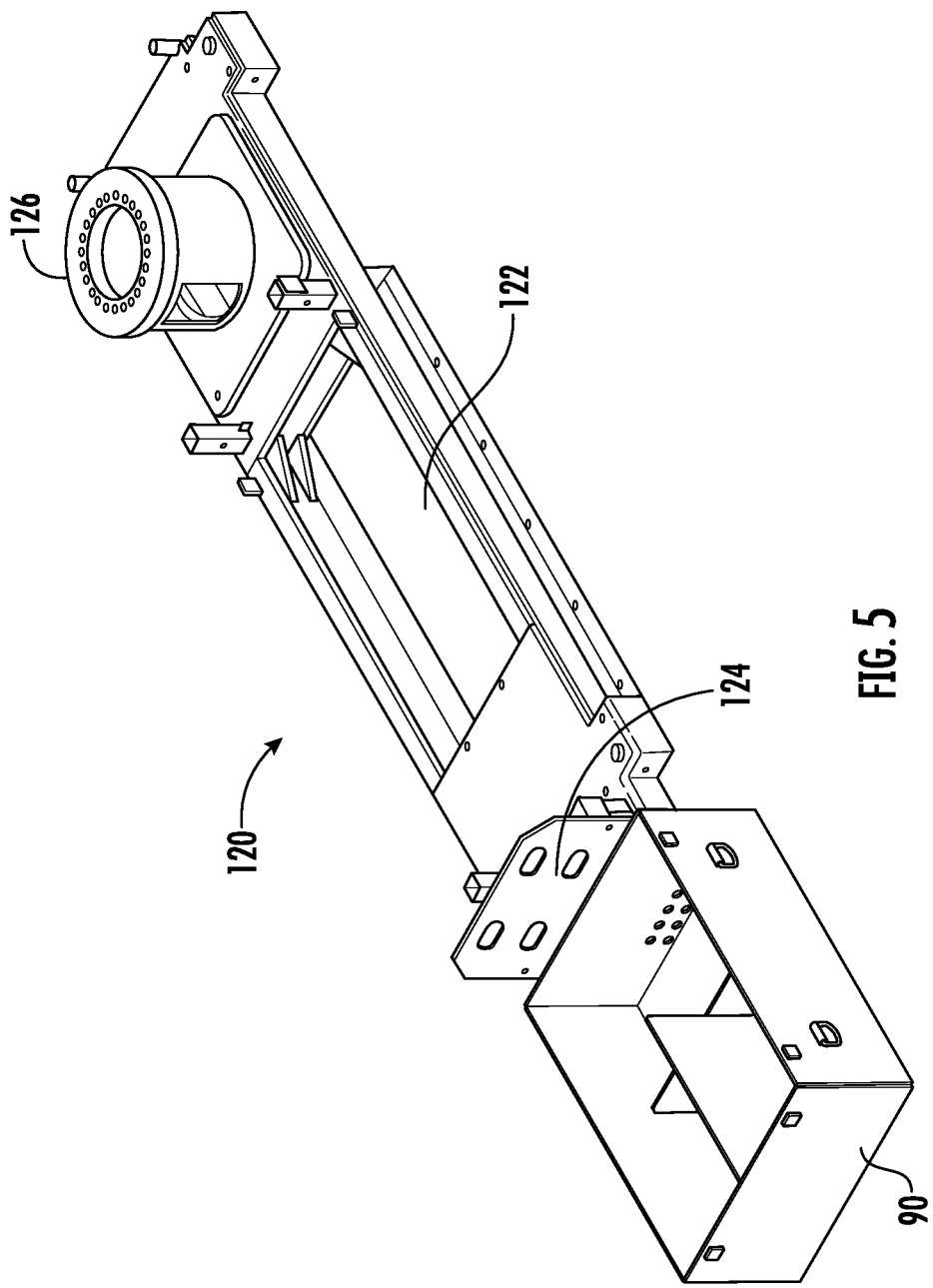
FIG. 5 is a perspective view of a slab including the battery box for the drive system in accordance with an exemplary embodiment of the present invention.
Figure 6:
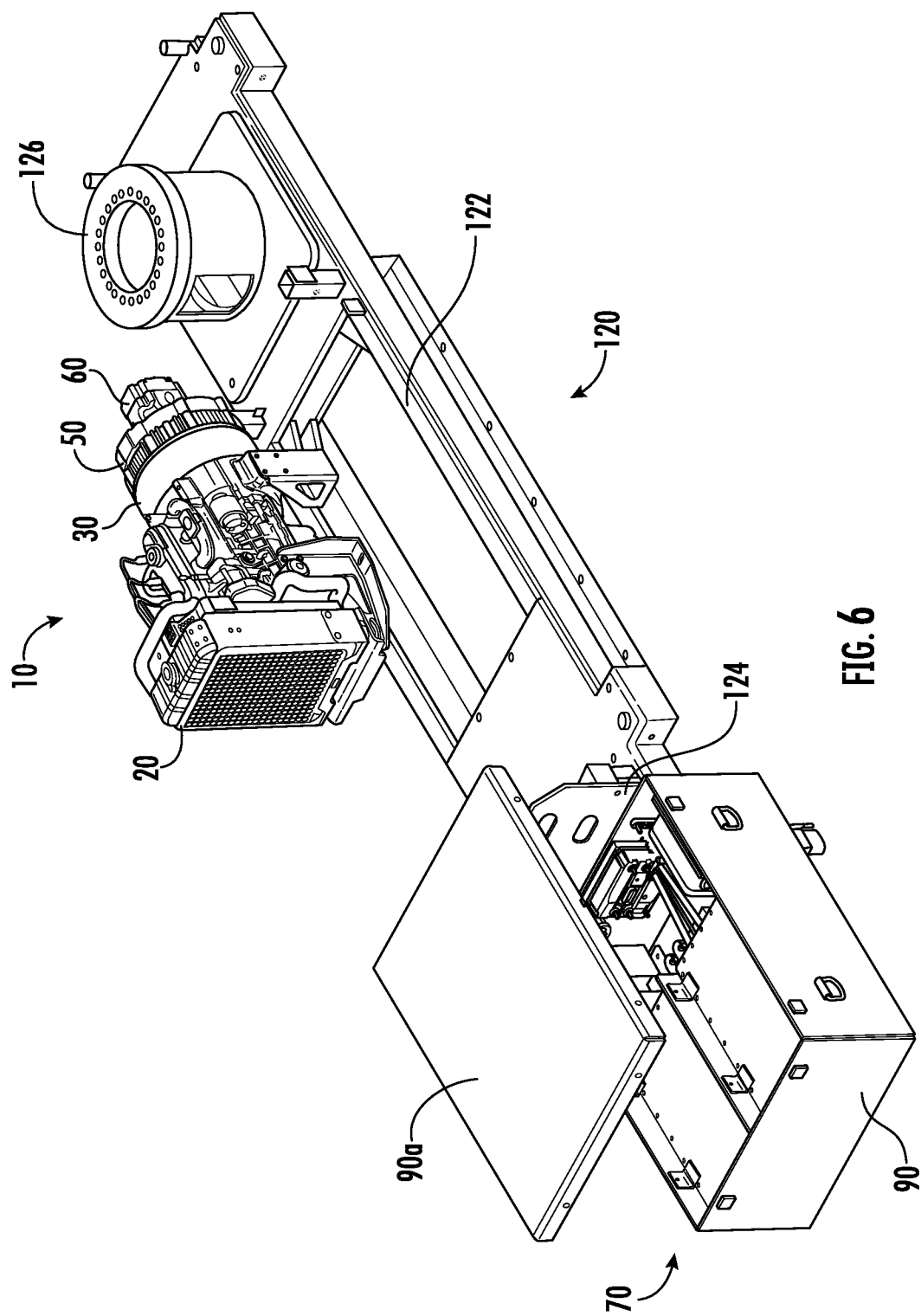
FIG. 6 is an exploded view of a slab and battery box including the battery bank system and the drive system in accordance with an exemplary embodiment of the present invention.

FIG. 5 shows a slab 120 which is used for supporting the drive system 10 and battery bank system 70. In particular, FIG. 6 shows the general configuration of mounting the drive system 10, including the mounting of the engine 20, the centrifugal clutch 40, the electrical generator/motor 50, and the hydraulic pump 60 onto the slab 120 and thence onto a vehicle body. The slab 120 includes an elongated engine bay 122 having an increased length over previous-type structures, in order to accommodate the engine/generator packs of the present drive system 10. The slab 120 also includes an enlarged head board 124 to protect the engine 20 and hydraulic tank 60a. The hydraulic tank 60a is directly in front of the engine and right behind the head board. The slab 120 also includes the battery box 90 shown in FIGS. 2 and 3 for supporting the battery bank system 70 and related components. A lid can be installed for use in transporting material. The slab 120 also includes a support column 126 for supporting the digger/derrick arm 112 and providing a passage for supporting hydraulic and electrical connections. The slab 120 is further used for mounting onto crawler treads, wheels, or other means of moving the digger/derrick system 110 onto a job site.

FIG. 7 depicts the configuration of a pressure sensor system 130 that can be added inline in the hydraulic line 116 of the hydraulic system. The pressure sensor system 130 includes a pressure transducer 132 to monitor hydraulic pressure in the hydraulic system. When the drive system 10 is used in hybrid mode while the battery bank system 70 powers the electrical generator/motor 50 and there is a constant "idle" pressure state in the hydraulic system, a timer 134 will start to count down. The idle pressure is preferably set to 375 PSI and the countdown time is preferably set at 2 minutes. However, any suitable setpoints can be selected without departing from the invention. Once the countdown reaches zero, the battery bank system 70 that powers the electrical generator/motor 50, which in turn powers the hydraulic pump 60, will automatically be shut off by a controller 136 connected to the pressure sensor system 130, where the controller 136 is configured to send a signal to shut off the hydraulic system upon detecting the idle pressure state, thereby saving battery charge when usage is at idle. During normal use, when the pressure spikes within the hydraulic system, the countdown timer restarts. In this manner, normal operation is not interrupted and the system only turns off when it has not been used for a predetermined period of time.

During regular operation of the digger/derrick 110 according to the present invention, the operator has the ability to either operate the machine in diesel mode or hybrid mode. During diesel mode, the centrifugal clutch 40 is engaged so that both the generator/motor 50 and the hydraulic pump 60 are engaged. During diesel mode the generator/motor 59 is charging the battery bank system 70 while the hydraulic pump 60 is powering the hydraulic system. During hybrid mode, the engine 20 is turned off and the centrifugal clutch 40 is decoupled. The battery bank system 70 powers the generator/motor 50 which in turn drives the hydraulic pump 60. While in hybrid mode, the drive system 10 emits zero emissions as the diesel engine 20 or other internal combustion engine is not being used.

Diesel mode operates in a manner consistent with prior art systems, though it will be additionally used for charging the battery bank system 70 while the engine 20 is running. An external charger can be used to accompany the digger/derrick 110 that can stay at the garage or be mounted to the machine of the company operating the machine. This can be used to apply a charge to the digger/derrick 110 machine using readily available utility or generator 110V or 220V power supplies.

In diesel mode, the engine 20 ultimately spins the hydraulic pump 60 thus providing the hydraulic flow required by the digger/derrick 110. When the engine 20 is off and the drive system 10 is in hybrid mode, the centrifugal clutch 40 is uncoupled, thus disconnecting the engine 20 from the generator/motor 50. The lithium-iron phosphate battery bank system 70 is then used in hybrid mode to deliver power to the generator/motor 50 to spin the hydraulic pump 60. The battery bank system 70 also includes a battery management system (BMS) to monitor battery status. The generator/motor also includes a controller that will distinguish its job. A master controller is included for handling system logic.

In accordance with the foregoing description, the digger/derrick 110 according to the present invention offers the advantages of noise reduction in that the hydraulic systems can be operated without running a noisy diesel engine that can be a nuisance to personnel and others at or near a job site. This noise reduction enhances safety since operators elevated in the derrick can more readily communicate with operators on the ground, thereby enabling the operators to each give clear warnings to avoid danger and other undesirable circumstances.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A drive system, comprising:
an engine for producing power for a hydraulic system to raise and lower a working component;
a centrifugal clutch having at least one internal flyweight in rotational engagement with the engine and a clutch drum connected to an output shaft, wherein the at least one internal flyweight rotationally engages the clutch drum while the engine is running;
an electrical generator/motor having a generator shaft attached to the clutch drum of the centrifugal clutch to produce electrical power while the engine is running; a hydraulic pump in operative mechanical engagement with the electrical generator/motor for powering the hydraulic system; and
a battery bank system charged by electrical power from the electrical generator/motor while the engine is running, wherein the battery bank system powers the electrical generator/motor when the engine is turned off and the centrifugal clutch is decoupled, which in turn drives the hydraulic pump.

2. The drive system of claim 1, wherein the working component comprises at least one of a digger/derrick arm, a boom, an auger, cylinders or tools.

3. The drive system of claim 1, further comprising an adapter ring mounted to the engine for centrally receiving the centrifugal clutch and engaging the electrical generator/motor, to ensure proper engagement from the clutch to the clutch drum to the generator/motor.

4. The drive system of claim 1, further comprising a slab for supporting the engine, the centrifugal clutch, the electrical generator/motor, and the hydraulic pump on a vehicle body, wherein the slab further comprises a battery box for supporting the battery bank system.

5. The drive system of claim 1, wherein the hydraulic system further comprises a pressure sensor system that detects an idle pressure state while the battery bank system powers the electrical generator/motor, the pressure sensor system further comprising a controller configured to shut off the hydraulic system upon detecting the idle pressure state, thereby saving battery charge.

6. The drive system of claim 5, wherein the pressure sensor system further comprises a timer configured to count down upon detecting the idle pressure state wherein the controller is configured to shut off the hydraulic system when the timer counts down to zero.

7. A drive system, comprising:
- a diesel engine for producing power for a hydraulic system to raise and lower a working component, wherein the diesel engine rotates a drive shaft having an axis of rotation;
- a centrifugal clutch having at least one internal flyweight in rotational engagement with the drive shaft of the diesel engine and a clutch drum connected to an output shaft coaxially configured with the drive shaft around the axis of rotation, wherein the at least one internal flyweight rotationally engages the clutch drum while the diesel engine is running;
- an electrical generator/motor having a generator shaft coaxially attached to the clutch drum around the axis of rotation to produce electrical power while the diesel engine is running;
- a hydraulic pump coaxially mounted to the electrical generator/motor around the axis of rotation for powering the hydraulic system; and
- a battery bank system charged by electrical power from the electrical generator/motor while the diesel engine is running, wherein the battery bank system powers the electrical generator/motor when the engine is turned off and the centrifugal clutch is decoupled, which in turn drives the hydraulic pump.

8. The drive system of claim 7, wherein the working component comprises at least one of a digger/derrick arm, a boom, an auger, cylinders or tools.

9. A drive system, comprising:
- an engine for producing power for a hydraulic system to raise and lower a working component;
- a centrifugal clutch having at least one internal flyweight in rotational engagement with the engine and a clutch drum connected to an output shaft, wherein the at least one internal flyweight rotationally engages the clutch drum while the engine is running;
- an electrical generator/motor having a generator shaft attached to the clutch drum of the centrifugal clutch to produce electrical power while the engine is running; a hydraulic pump in operative mechanical engagement with the electrical generator/motor for powering the hydraulic system;
- a battery bank system charged by electrical power from the electrical generator/motor while the engine is running, wherein the battery bank system powers the electrical generator/motor when the engine is turned off and the centrifugal clutch is decoupled, which in turn drives the hydraulic pump; and
- a pressure sensor system that detects an idle pressure state while the battery bank system powers the electrical generator/motor, the pressure sensor system further comprising a controller configured to shut off the hydraulic system upon detecting the idle pressure state, thereby saving battery charge, wherein the pressure sensor system further comprises a timer configured to count down upon detecting the idle pressure state wherein the controller is configured to shut off the hydraulic system when the timer counts down to zero.

* * * * *